United States Patent
Mironov et al.

(10) Patent No.: US 11,831,888 B2
(45) Date of Patent: *Nov. 28, 2023

(54) REDUCING LATENCY IN WIRELESS VIRTUAL AND AUGMENTED REALITY SYSTEMS

(71) Applicant: ATI Technologies ULC, Markham (CA)

(72) Inventors: Mikhail Mironov, Markham (CA); Gennadiy Kolesnik, Markham (CA); Pavel Siniavine, Markham (CA)

(73) Assignee: ATI Technologies ULC, Markham (CA)

( * ) Notice: Subject to any disclaimer, the term of this patent is extended or adjusted under 35 U.S.C. 154(b) by 64 days.

This patent is subject to a terminal disclaimer.

(21) Appl. No.: 17/378,323

(22) Filed: Jul. 16, 2021

(65) Prior Publication Data

US 2021/0344939 A1   Nov. 4, 2021

Related U.S. Application Data

(63) Continuation of application No. 16/716,122, filed on Dec. 16, 2019, now Pat. No. 11,070,829.

(51) Int. Cl.
*H04N 19/436* (2014.01)
*H04N 19/42* (2014.01)
*H04N 19/174* (2014.01)

(52) U.S. Cl.
CPC ......... *H04N 19/436* (2014.11); *H04N 19/174* (2014.11); *H04N 19/439* (2014.11)

(58) Field of Classification Search
CPC ... H04N 19/436; H04N 19/174; H04N 19/439
See application file for complete search history.

(56) References Cited

U.S. PATENT DOCUMENTS 5,592,227 A   1/1997   Feng
5,768,533 A   6/1998   Ran
(Continued)

FOREIGN PATENT DOCUMENTS

EP   3098762 A1   11/2016
WO   2017003887 A1   1/2017

OTHER PUBLICATIONS

Hoffman et al., "RTP Payload Format for MPEG1/MPEG2 Video", RFC 2250, Jan. 1998, 16 pages, https://www.rfc-editor.org/info/rfc2250.

(Continued)

*Primary Examiner* — Nam D Pham
(74) *Attorney, Agent, or Firm* — KOWERT HOOD MUNYON RANKIN AND GOETZEL PC; Rory D. Rankin

(57) ABSTRACT

Systems, apparatuses, and methods for reducing latency for wireless virtual and augmented reality applications are disclosed. A virtual reality (VR) or augmented reality (AR) system includes a transmitter rendering, encoding, and sending video frames to a receiver coupled to a head-mounted display (HMD). In one scenario, rather than waiting until the entire frame is encoded before sending the frame to the receiver, the transmitter sends an encoded left-eye portion to the receiver while the right-eye portion is being encoded. In another scenario, the frame is partitioned into a plurality of slices, and each slice is encoded and then sent to the receiver while the next slice is being encoded. In a further scenario, each slice is being encoded while the next slice is being rendered. In a still further scenario, each slice is prepared for presentation by the receiver while the next slice is being decoded by the receiver.

18 Claims, 12 Drawing Sheets

(56) References Cited

U.S. PATENT DOCUMENTS

| | | | |
|---|---|---|---|
| 6,067,287 | A | 5/2000 | Chung-Ju et al. |
| 6,131,660 | A | 10/2000 | Stuebinger et al. |
| 6,654,539 | B1 | 11/2003 | Duruoz et al. |
| 10,078,794 | B2 | 9/2018 | Pierce et al. |
| 10,523,947 | B2 | 12/2019 | Amer et al. |
| 10,594,901 | B2 | 3/2020 | Sines et al. |
| 10,762,392 | B2 | 9/2020 | Zhang et al. |
| 11,070,829 | B2 | 7/2021 | Mironov et al. |
| 2005/0053157 | A1 | 3/2005 | Lillevold |
| 2006/0039483 | A1 | 2/2006 | Lee et al. |
| 2009/0284581 | A1 | 11/2009 | Elbaz et al. |
| 2012/0182582 | A1 | 7/2012 | Nagai |
| 2012/0243602 | A1 | 9/2012 | Rajamani et al. |
| 2015/0195379 | A1 | 7/2015 | Zhang et al. |
| 2016/0219301 | A1 | 7/2016 | Pettersson et al. |
| 2017/0041625 | A1 | 2/2017 | Bates et al. |
| 2017/0064320 | A1 | 3/2017 | Sadhwani et al. |
| 2017/0105010 | A1 | 4/2017 | Wu et al. |
| 2017/0243319 | A1 | 8/2017 | Wittenbrink et al. |
| 2018/0189641 | A1 | 7/2018 | Boesch et al. |
| 2019/0028752 | A1 | 1/2019 | Zhang et al. |
| 2019/0042177 | A1* | 2/2019 | Tanner .................. G06F 3/1454 |
| 2019/0147332 | A1 | 5/2019 | Lagudu et al. |
| 2019/0158704 | A1 | 5/2019 | Sines et al. |
| 2019/0325305 | A1 | 10/2019 | Zhang et al. |
| 2019/0335189 | A1 | 10/2019 | Abdelkhalek et al. |
| 2020/0134432 | A1 | 4/2020 | Lagudu et al. |
| 2020/0302285 | A1 | 9/2020 | Wang et al. |

OTHER PUBLICATIONS

International Search Report and Written Opinion in International Application No. PCT/IB2019/051542, dated May 31, 2019, 8 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation Test in Europe, Mar. 14, 2016, pp. 1393-1398.

International Search Report and Written Opinion in International Application No. PCT/IB2020/061991, dated Mar. 2, 2021, 12 pages.

* cited by examiner

REDUCING LATENCY IN WIRELESS VIRTUAL AND AUGMENTED REALITY SYSTEMS

CROSS REFERENCE TO RELATED APPLICATIONS

This application is a continuation of U.S. patent application Ser. No. 16/716,122, now U.S. Pat. No. 11,070,829, entitled "REDUCING LATENCY IN WIRELESS VIRTUAL AND AUGMENTED REALITY SYSTEMS", filed Dec. 16, 2019, the entirety of which is incorporated herein by reference.

BACKGROUND

Description of the Related Art

In order to create an immersive environment for the user, virtual reality (VR) and artificial reality (AR) video streaming applications typically require high resolution and high frame-rates, which equates to high data-rates. Standard video codecs like H.264 and High Efficiency Video Coding (HEVC) are commonly used to encode the video frames rendered as part of the VR or AR application. As resolutions and refresh rates of VR and AR displays increase, the latency required for rendering, encoding, transmitting, decoding, and preparing frames for display becomes a major limiting factor.

Additional elements in wireless VR and AR systems introduce more latency. This latency consists of the relatively constant latency of operations performed by an encoder and a decoder as well as the variable latency of wireless transmission. This additional latency is not present in traditional wired VR and AR systems and can be significant, causing rendered frames to be presented on the client which are delayed relative to the moments when the respective head poses were obtained. Without special measures to reduce these delays, images shown in the headset will lag head movements, breaking immersion and causing nausea and eye strain.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for reducing latency for wireless virtual and augmented reality applications are disclosed herein. In one implementation, a virtual reality (VR) or augmented reality (AR) system includes a transmitter rendering, encoding, and sending video frames to a receiver coupled to a head-mounted display (HMD). In one scenario, rather than waiting until the entire frame is encoded before sending the frame to the receiver, the transmitter sends a left-eye portion to the receiver while the right-eye portion is being encoded. In another scenario, the frame is partitioned into a plurality of slices, and each slice is encoded and then sent to the receiver while the next slice is being encoded. For example, the transmitter sends an encoded version of a first slice to the receiver prior to receiving the entirety of an encoded version of a second slice from the encoder. In a further scenario, each slice is being encoded while the next slice is being rendered. In a still further scenario, each slice is prepared for presentation by the receiver while the next slice is being decoded by the receiver.

Figure 1:
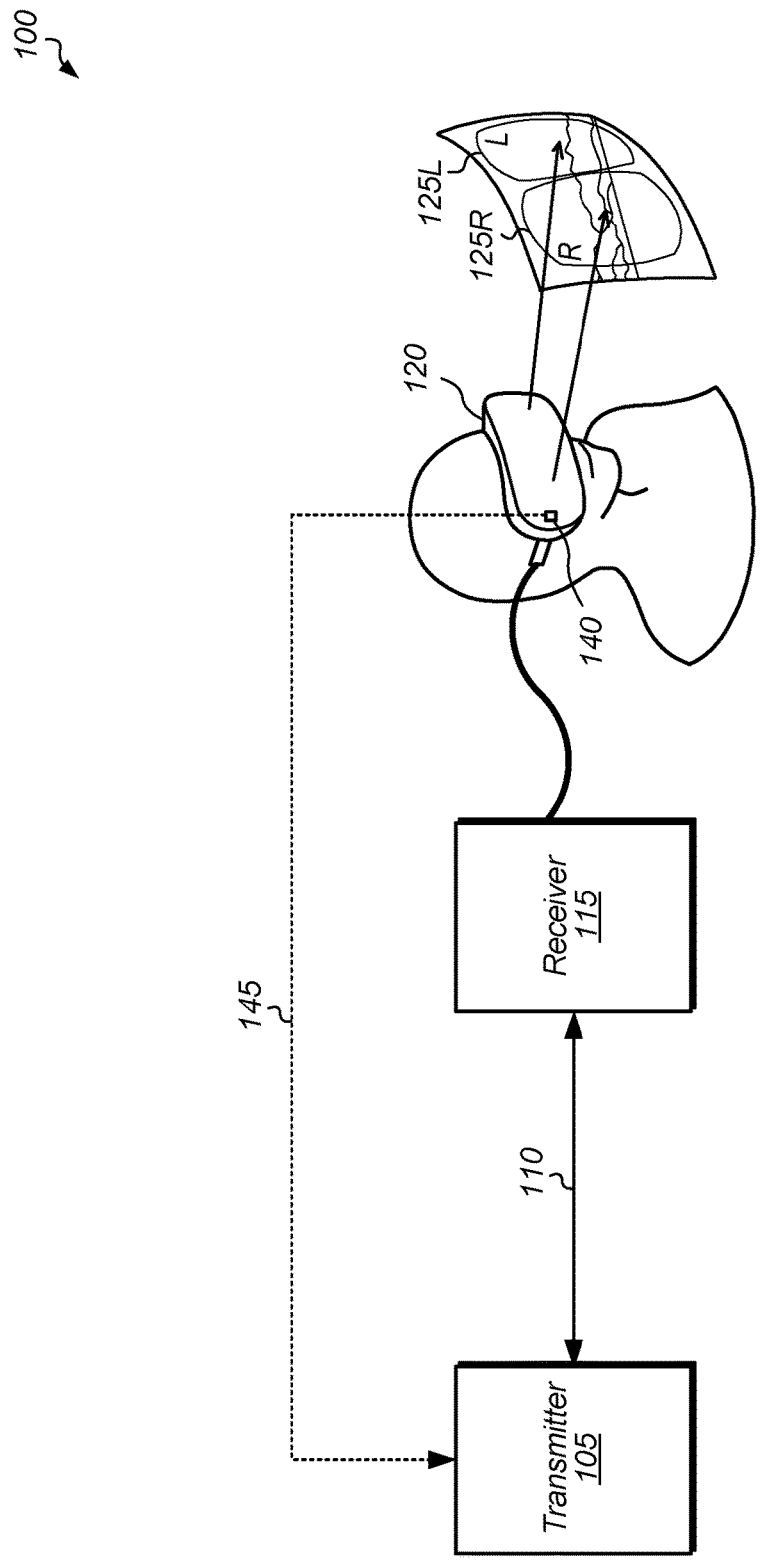
FIG. 1 is a block diagram of one implementation of a system.

Referring now to FIG. 1, a block diagram of one implementation of a system 100 is shown. In one implementation, system 100 includes transmitter 105, channel 110, receiver 115, and head-mounted display (HMD) 120. It is noted that in other implementations, system 100 can include other components than are shown in FIG. 1. In one implementation, channel 110 is a wireless connection between transmitter 105 and receiver 115. In another implementation, channel 110 is representative of a network connection between transmitter 105 and receiver 115. Any type and number of networks can be employed depending on the implementation to provide the connection between transmitter 105 and receiver 115. For example, transmitter 105 is part of a cloud-service provider in one particular implementation.

In one implementation, transmitter 105 receives a video sequence to be encoded and sent to receiver 115. In another implementation, transmitter 105 includes a rendering unit which is rendering the video sequence to be encoded and transmitted to receiver 115. In one implementation, the rendering unit generates rendered images from graphics information (e.g., raw image data). It is noted that the terms "image", "frame", and "video frame" can be used interchangeably herein.

In order to reduce the latency of the data being transferred, various techniques for slice-based processing of frames are used on transmitter 105 and/or receiver 115. In one implementation, when receiver 115 receives each slice of a frame, receiver 115 decodes and prepares the slices for presentation in parallel. Once a complete frame is ready, receiver 115 drives the frame to HMD 120. In one implementation, within each image that is displayed on HMD 120, a right-eye portion of the image is driven to the right side 125R of HMD 120 while a left-eye portion of the image is driven to left side 125L of HMD 120. In one implementation, receiver 115 is separate from HMD 120, and receiver 115 communicates with HMD 120 using a wired or wireless connection. In another implementation, receiver 115 is integrated within HMD 120.

Transmitter 105 and receiver 115 are representative of any type of communication devices and/or computing devices. For example, in various implementations, transmitter 105 and/or receiver 115 can be a mobile phone, tablet, computer, server, HMD, another type of display, router, or other types of computing or communication devices. In one implementation, system 100 executes a virtual reality (VR) application for wirelessly transmitting frames of a rendered virtual environment from transmitter 105 to receiver 115. In other implementations, other types of applications (e.g., augmented reality (AR) applications) can be implemented by system 100 that take advantage of the methods and mechanisms described herein.

In one implementation, the location of the user's head is determined based on one or more head tracking sensors 140 within HMD 120. In one implementation, the head location information is transmitted from head tracking sensor(s) 140 to transmitter 105 using communication interface 145. In one implementation, the head location information is provided to the rendering source of the VR/AR video of transmitter 105. In one implementation, the rendering unit uses the head location information when rendering the next frame to be displayed to the user.

Figure 2:
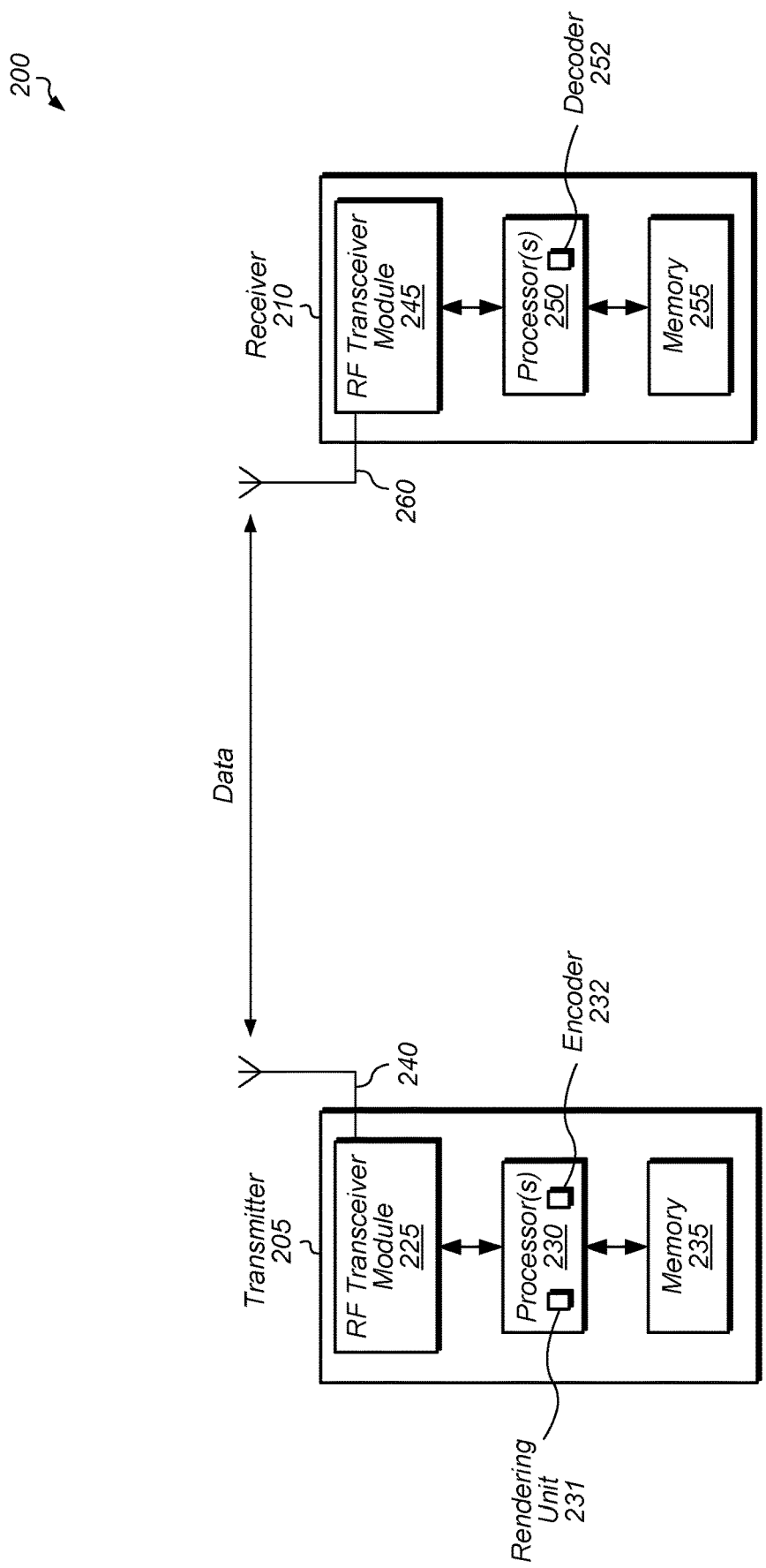
FIG. 2 is a block diagram of one implementation of a system.

Turning now to FIG. 2, a block diagram of one implementation of a system 200 is shown. System 200 includes at least a first communications device (e.g., transmitter 205) and a second communications device (e.g., receiver 210) operable to communicate with each other wirelessly. It is noted that transmitter 205 and receiver 210 can also be referred to as transceivers. In one implementation, transmitter 205 and receiver 210 communicate wirelessly over the unlicensed 60 Gigahertz (GHz) frequency band. For example, in this implementation, transmitter 205 and receiver 210 communicate in accordance with the Institute of Electrical and Electronics Engineers (IEEE) 802.11ad standard (i.e., WiGig). In other implementations, transmitter 205 and receiver 210 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc.

Transmitter 205 and receiver 210 are representative of any type of communication devices and/or computing devices. For example, in various implementations, transmitter 205 and/or receiver 210 can be a mobile phone, tablet, computer, server, head-mounted display (HMD), television, another type of display, router, or other types of computing or communication devices. In one implementation, system 200 executes a virtual reality (VR) application for wirelessly transmitting frames of a rendered virtual environment from transmitter 205 to receiver 210. In other implementations, other types of applications can be implemented by system 200 that take advantage of the methods and mechanisms described herein.

In one implementation, transmitter 205 includes at least radio frequency (RF) transceiver module 225, processor 230, memory 235, and antenna 240. RF transceiver module 225 transmits and receives RF signals. In one implementation, RF transceiver module 225 is a mm-wave transceiver module operable to wirelessly transmit and receive signals over one or more channels in the 60 GHz band. RF transceiver module 225 converts baseband signals into RF signals for wireless transmission, and RF transceiver module 225 converts RF signals into baseband signals for the extraction of data by transmitter 205. It is noted that RF transceiver module 225 is shown as a single unit for illustrative purposes. It should be understood that RF transceiver module 225 can be implemented with any number of different units (e.g., chips) depending on the implementation. Similarly, processor 230 and memory 235 are representative of any number and type of processors and memory devices, respectively, that are implemented as part of transmitter 205. In one implementation, processor 230 includes rendering unit 231 to render frames of a video stream and encoder 232 to encode (i.e., compress) a video stream prior to transmitting the video stream to receiver 210. In other implementations, rendering unit 231 and/or encoder 232 are implemented separately from processor 230. In various implementations, rendering unit 231 and encoder 232 are implemented using any suitable combination of hardware and/or software.

Transmitter 205 also includes antenna 240 for transmitting and receiving RF signals. Antenna 240 represents one or more antennas, such as a phased array, a single element antenna, a set of switched beam antennas, etc., that can be configured to change the directionality of the transmission and reception of radio signals. As an example, antenna 240 includes one or more antenna arrays, where the amplitude or phase for each antenna within an antenna array can be configured independently of other antennas within the array. Although antenna 240 is shown as being external to transmitter 205, it should be understood that antenna 240 can be included internally within transmitter 205 in various implementations. Additionally, it should be understood that transmitter 205 can also include any number of other components which are not shown to avoid obscuring the figure. Similar to transmitter 205, the components implemented within receiver 210 include at least RF transceiver module 245, processor 250, decoder 252, memory 255, and antenna 260, which are analogous to the components described above for transmitter 205. It should be understood that receiver 210 can also include or be coupled to other components (e.g., a display).

Figure 3:
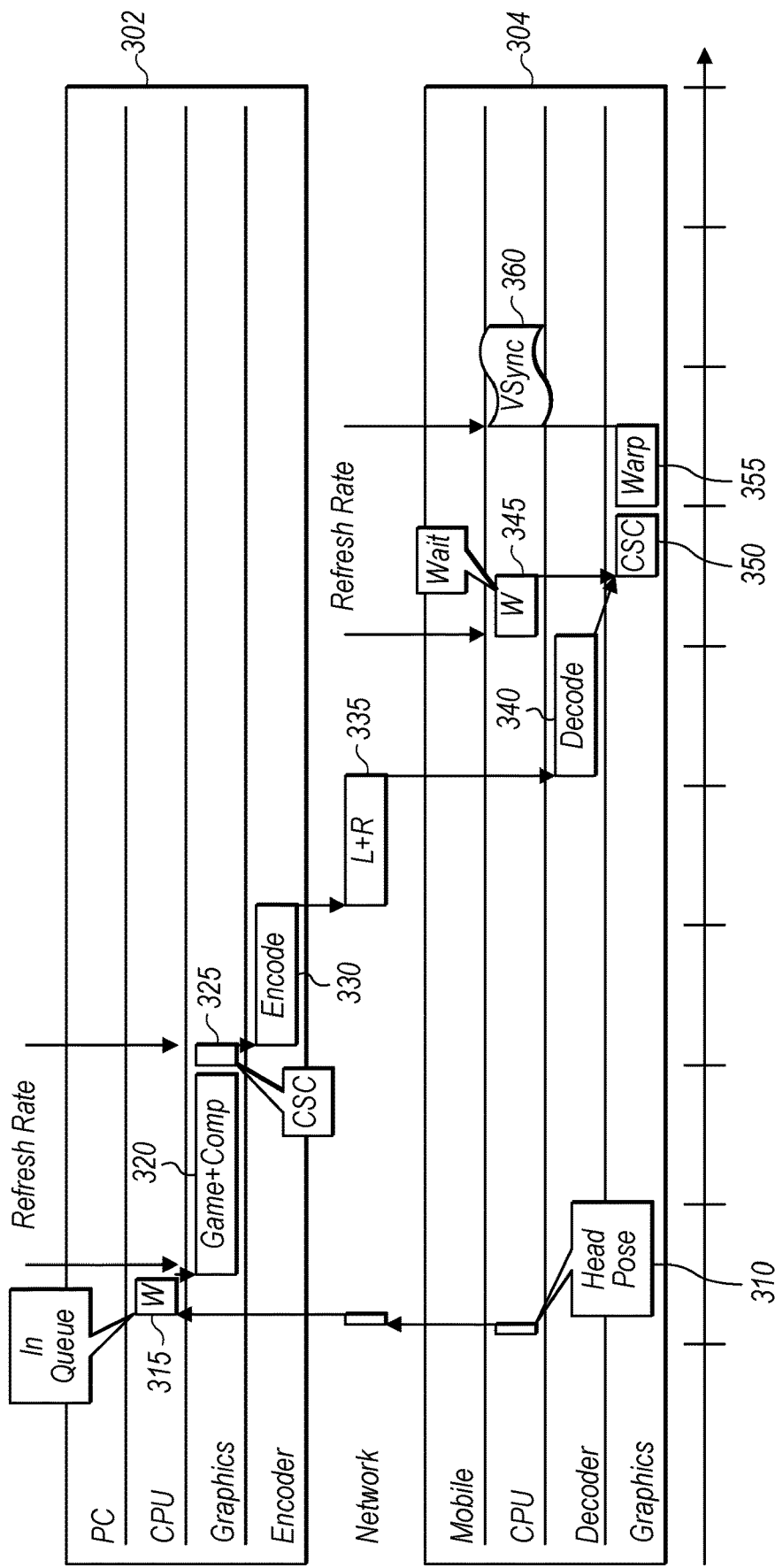
FIG. 3 is a timing diagram of one implementation of a conventional wireless VR/AR system.

Referring now to FIG. 3, a timing diagram of one implementation of a conventional wireless VR/AR system is shown. In one implementation, a wireless VR/AR system includes a computing device 302 coupled to a mobile device 304 with a head-mounted display (HMD) for displaying VR/AR video to a user. In one implementation, computing device 302 is representative of transmitter 105 (of FIG. 1) and mobile device 304 is representative of receiver 115.

Depending on the implementation, computing device 302 can be any type of computing device (e.g., personal computer (PC)).

Each row of the timing diagram of computing device 302 corresponds to a different component of the computing device, with CPU, graphics engine, and encoder shown in FIG. 3. Similarly, each row of the timing diagram of mobile device 304 corresponds to a different component of mobile device 304. These different components include a CPU, decoder, and graphics engine. In other implementations, computing device 302 and mobile device 304 can include other components which perform the steps shown in FIG. 3. In one implementation, computer 302 renders VR/AR frames, then encodes the frames, and then sends the encoded frames over a wireless network to be decoded and displayed by mobile device 304.

In one implementation, mobile device 304 sends a head pose 310 of the user to computing device 302 over the wireless network. In one implementation, the term "head pose" is defined as both the position of the head (e.g., the X, Y, Z coordinates in the three-dimensional space) and the orientation of the head. The orientation of the head can be specified as a quaternion, as a set of three angles called the Euler angles, or otherwise. It should be understood that head pose 310 can also include an indication of the direction, acceleration, and other parameters of the user's eyes or gaze in addition to the orientation of the user's head. Computing device 302 queues the head pose 310 and waits 315 until rendering of the next frame is initiated. When the graphics engine is ready to initiate rendering of the next frame, rendering is performed for the game (or another application in another implementation) using the head pose received from 304 and then the rendered frame is sent to a compositor. This is represented by rendering and compositing block 320 of FIG. 3. In one implementation, after rendering and compositing, a color space conversion (CSC) 325 is performed to convert the rendered frame from the RGB color space to the YUV color space.

Then, the output of CSC 325 is provided to the encoder and encoding 330 of the rendered and color space converted frame is performed. The outputs of the encoding step 330 are the left eye and right eye portions of the frame 335 which are sent over the network to mobile device 304. Upon receiving the encoded frame, mobile device 304 performs a decoding step 340 to decode the encoded frame. Then, mobile device 304 goes into a wait mode 345 until the frame is ready to be driven to the display. Next, a CSC 350 is performed to convert the frame back to the RGB space. Then, a warp step 355 is performed to timewarp the frame for display based on the user's updated head pose. Next, the frame is driven to the display at the next vertical synchronization (VSync) signal 360. In one implementation, the boundaries of each frame period are determined by VSync signals. In other words, the start of a frame period coincides with a VSync signal and the end of the frame period coincides with the next VSync signal. As used herein, the term "frame period" is defined as the reciprocal of the frame rate.

As can be seen from the multiple steps in the rendering, encoding, and decoding process, the latency experienced by a typical VR/AR system can be relatively long. This is caused by each step of the process waiting for the previous step to finish on the entire frame prior to commencing. Accordingly, techniques to reduce the latency experienced by a typical VR/AR system are desired.

Figure 4:
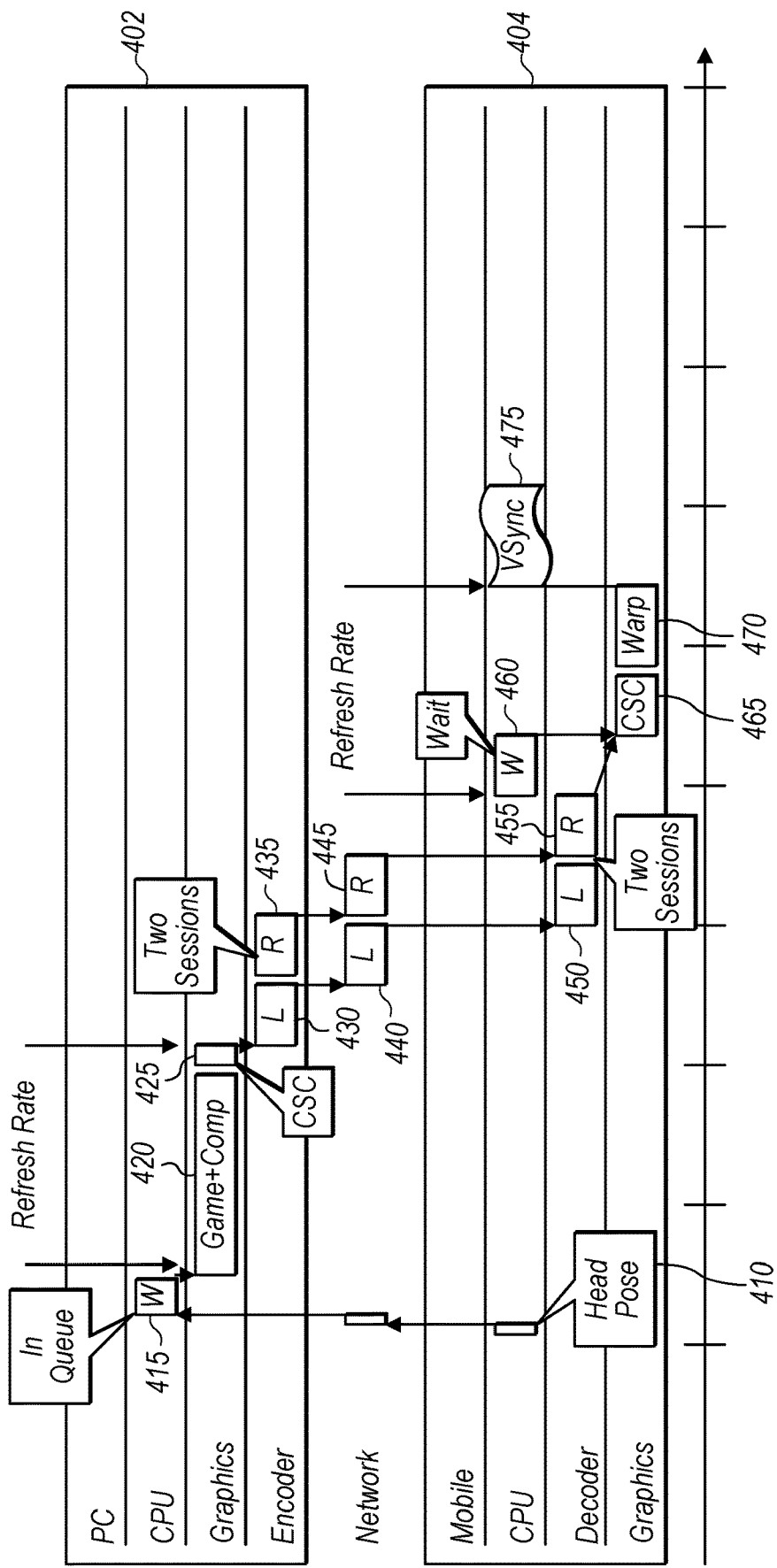
FIG. 4 is a timing diagram of one example of a reduced latency wireless VR/AR system.

Turning now to FIG. 4, a timing diagram of one example of a reduced latency wireless VR/AR system is shown. In one implementation, a wireless VR/AR system includes computing device 402 and mobile device 404 with a HMD. It is noted that computing device 402 is representative of any type of computing device (e.g., laptop, desktop, server). Similar to the timing diagram shown in FIG. 3, the first step in the process is capturing the current head pose 410 of the user and conveying an indication of the current head pose 410 over the network from mobile device 402 to computing device 404. Computing device 404 then implements a wait phase 415 while waiting for rendering of the next frame to start.

Rendering phase 420 occurs after wait phase 415, and then a CSC phase 425 follows rendering phase 420 to convert the rendered frame from the RGB color space to the YUV color space. Then, using a technique to reduce latency, the encoder splits the encoding of the rendered frame into two steps, a left eye portion encoding step 430 and a right eye portion encoding step 435. Once the left-eye portion has been encoded 430, the encoded left-eye portion is sent over the network in step 440 in parallel with the right-eye portion being encoded in step 435. This helps to reduce the latency as compared to the timing diagram shown in FIG. 3 when the computing device 302 waited until the entire frame was encoded before starting to send the encoded frame over the network to mobile device 304.

While the encoded left-eye portion is being sent over the network in step 440, the right-eye portion is being encoded in step 435. Then, once encoding of the right-eye portion is complete and the encoded left-eye portion has been sent to mobile device 404, the encoded right-eye portion is sent over the network to mobile device 404 in step 445. While the right-eye portion is sent over the network in step 445, the decoder is decoding the left-eye portion in step 450. It is noted that steps 445 and 450 are performed in parallel to reduce the total latency of the frame processing steps.

After the left-eye portion of the frame is decoded in step 450, the right-eye portion of the frame is decoded in step 455. Next, mobile device 404 implements a wait phase 460, with the duration of wait phase 460 dependent on the frame refresh rate. After wait phase 460, a CSC step 465 is performed followed by a warp step 470 which is completed in time for VSync 475. The performing of parallel steps for the left and right eye portions of the frame shown in the timing diagram of FIG. 4 helps to reduce the overall latency of the operations for the wireless VR/AR system.

Figure 5:
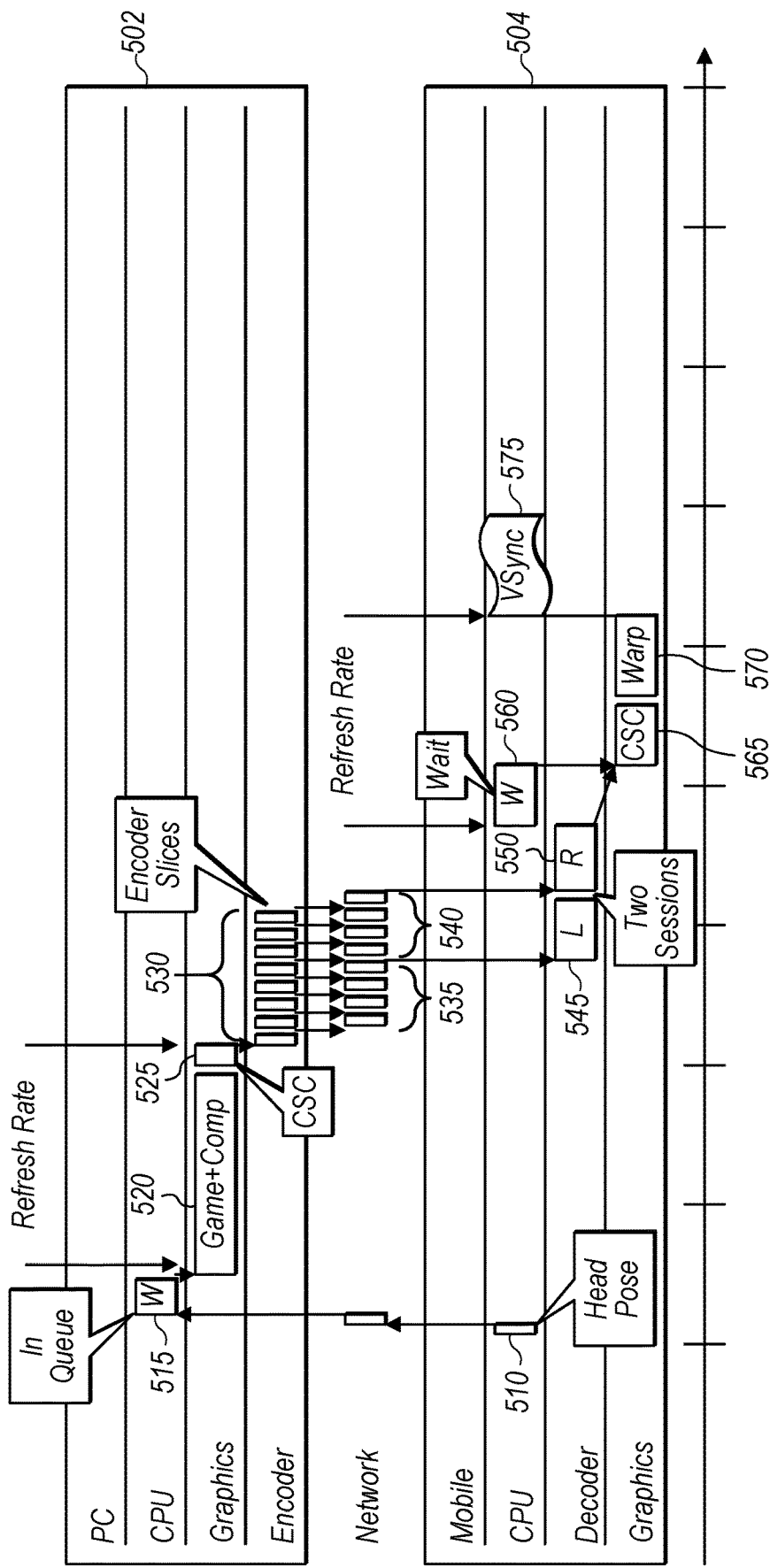
FIG. 5 is a timing diagram of another example of a technique to reduce latency of a wireless VR/AR system.

Referring now to FIG. 5, a timing diagram of another example of a technique to reduce latency of a wireless VR/AR system is shown. The first step of the process is mobile device 504 capturing the head pose 510 of the user and sending an indication of head pose 510 to computing device 502 where it is stored in a queue while computing device 502 waits 515 for the initiation of the next frame according to the video refresh rate.

Next, rendering and compositing 520 of the frame is performed followed by a CSC step 525. Then, in an enhancement designed to reduce latency in the system, the encoder partitions the frame into a plurality of slices 530 and encodes each slice individually. The encoder sends each slice over the network to mobile device 504 once the slice has been encoded. While a first slice is being sent over the network, a second slice is being encoded in parallel. This process continues, with a given slice being encoded while the previous slice is being sent over the network. The frame can be partitioned into any number of slices, with the number of slices varying according to the implementation.

When all of the encoded slices 535 of the left-eye portion have been sent over the network to mobile device 504, the decoder starts decoding the left-eye portion in step 545.

Then, when all of the encoded slices 540 of the right-eye portion have been sent over the network and received by mobile device 504, the decoder performs decoding step 550 for the right-eye portion. Once the decoder has finished decoding step 550 on the right-eye portion, mobile device 504 transitions to a wait mode 560 according to the refresh rate of the display (e.g., HMD). Then, a CSC step 565 is performed followed by a warp step 570 in time for the next VSync 575 to display the frame. By partitioning the frame into multiple slices 530 and encoding and sending these slices 530 in parallel, latency is reduced for the system.

Figure 6:
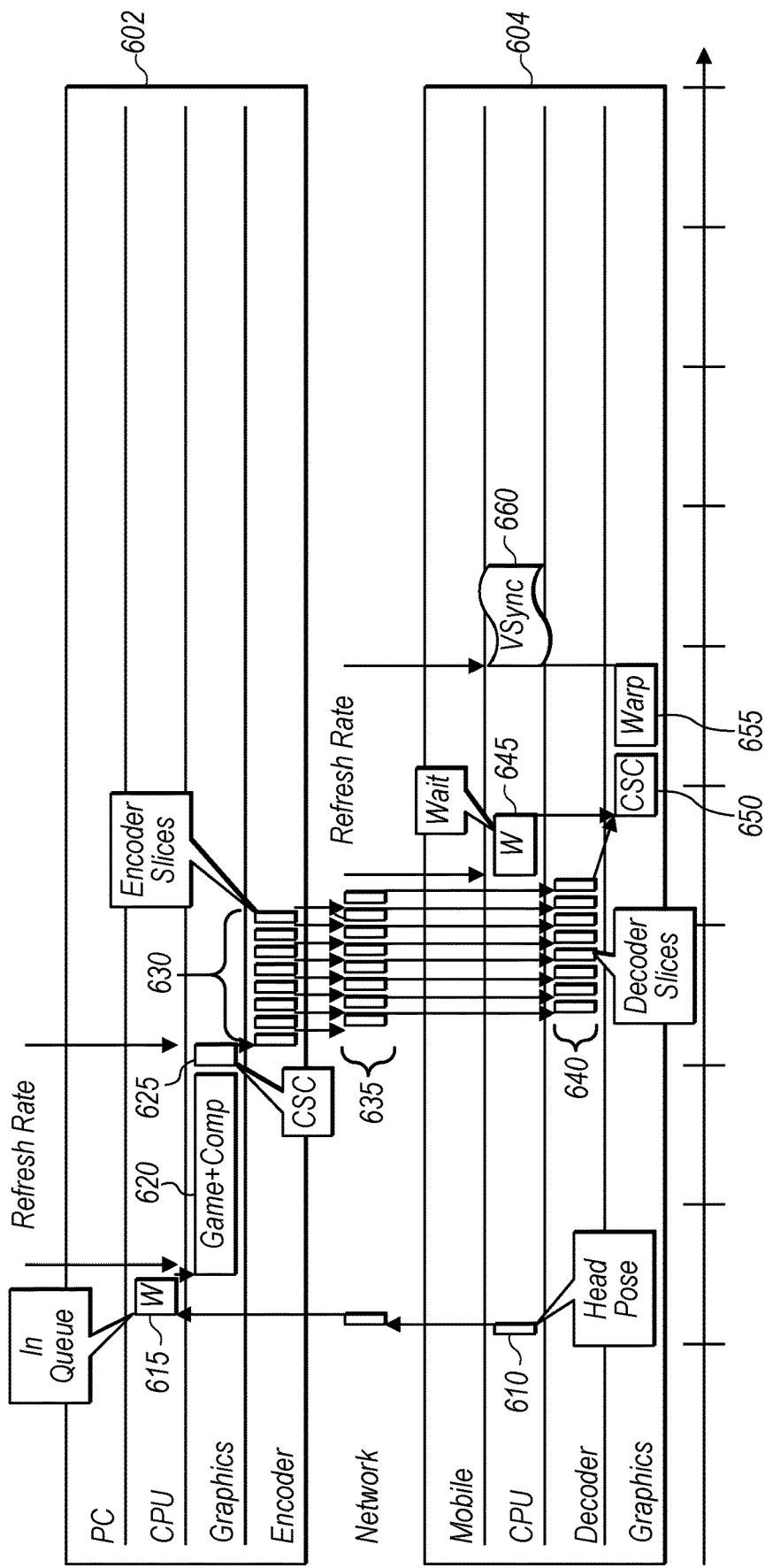
FIG. 6 is a timing diagram of a further latency reduction enhancement to a wireless VR/AR.

Turning now to FIG. 6, a timing diagram of a further latency reduction enhancement to a wireless VR/AR is shown. At the start of a cycle, mobile device 604 captures the user's head pose 610 and forwards the head pose 610 over the network to computing device 602 which waits 615 after storing head pose 610 in a queue. Next, the graphics engine renders and composites the frame in step 620 followed by CSC step 625. Then, the encoder encodes individual slices 630 of the frame and sends the encoded slices over the network in step 635.

Next, in an enhancement over the previous timing diagram (of FIG. 5), the decoder of mobile device 604 decodes individual slices 640 when they are received rather than waiting for an entire eye portion of the encoded frame to be received. This allows the decoder to start decoding the first slice as soon as the first slice is received in its entirety, with the decoding of the first slice occurring in parallel with the second slice being sent over the network. Then, when the second slice has been received in its entirety, the second slice is decoded in parallel with the third slice being sent over the network. This process continues for each slice that is sent over the network. The above process helps to reduce the latency of the decoding step. The decoding step is followed by the wait phase 645, CSC step 650, and warp step 655. The frame is displayed after the warp step 655 in time for the next VSync 660.

Figure 7:
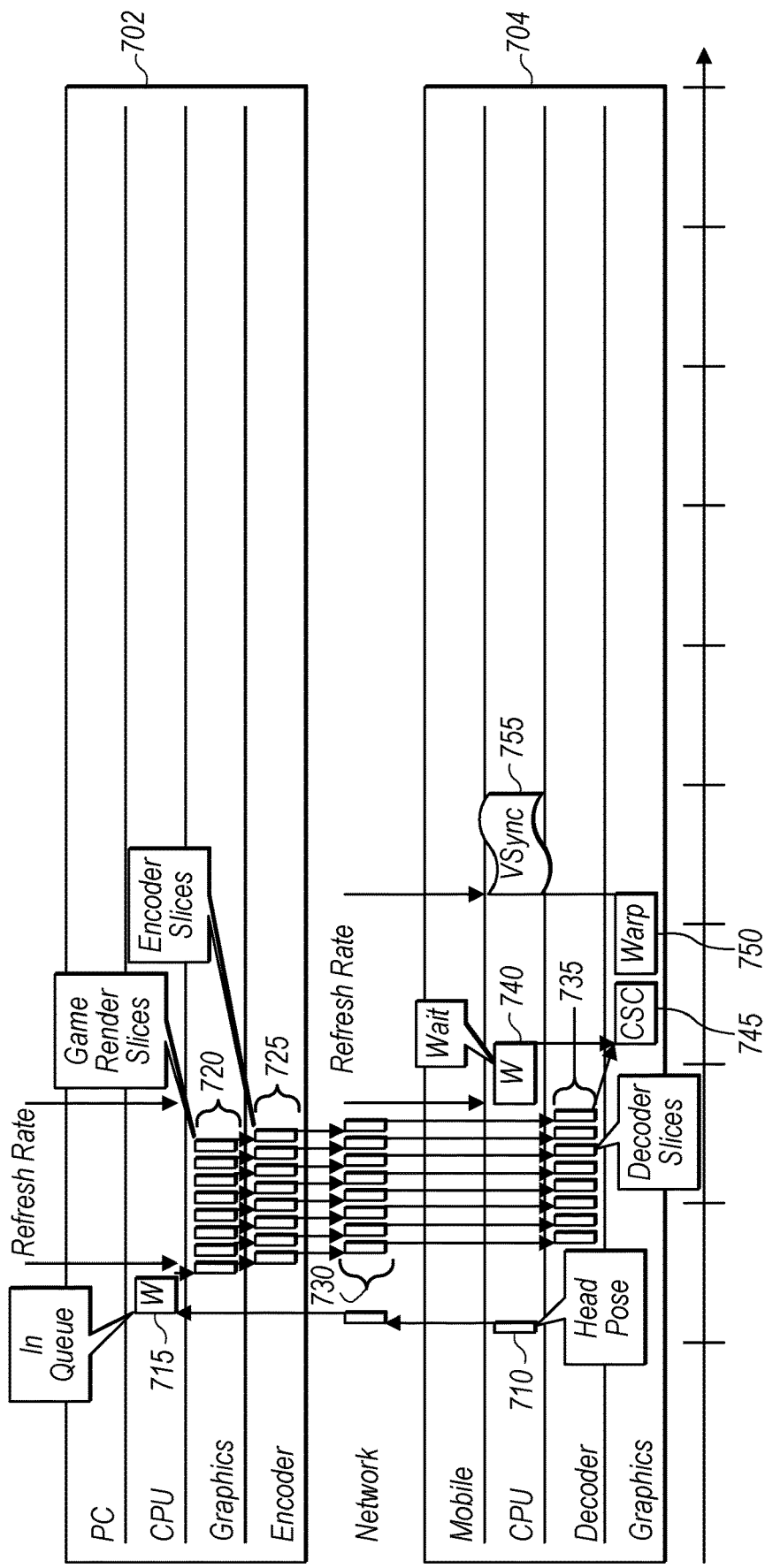
FIG. 7 is a timing diagram of a further enhancement to a wireless VR/AR system for reducing latency.

Referring now to FIG. 7, a timing diagram of a further enhancement to a wireless VR/AR system for reducing latency is shown. While the initial steps of capturing the head pose 710 and waiting 715 at the computing device 702 after receiving the head pose 710 remain the same, the rendering step 720 is performed on slices of the frame rather than on the entire frame. This allows each slice of the frame to be rendered independently of the other slices, and once a first slice of the frame has been rendered, the encoder encodes the first slice while the second slice is being rendered. This process continues for the other slices being rendered while slices 725 are being encoded in parallel.

Then, once a given slice is encoded, the slice is sent over the network to mobile device 704 in step 730. As an enhancement to the prior techniques, steps 720, 725, and 730 for rendering, encoding, and transmitting over the network, respectively, are performed in parallel. Also, once each slice is received by mobile device 704, the slice is decoded in step 735. It is noted that step 735 is performed in parallel with steps 720, 725, and 730. Mobile device 704 waits 740 after the decoding step 735 until performing the CSC step 745 and warp step 750. Following warp step 750, the frame is displayed in synchronization with VSync 755.

Figure 8:
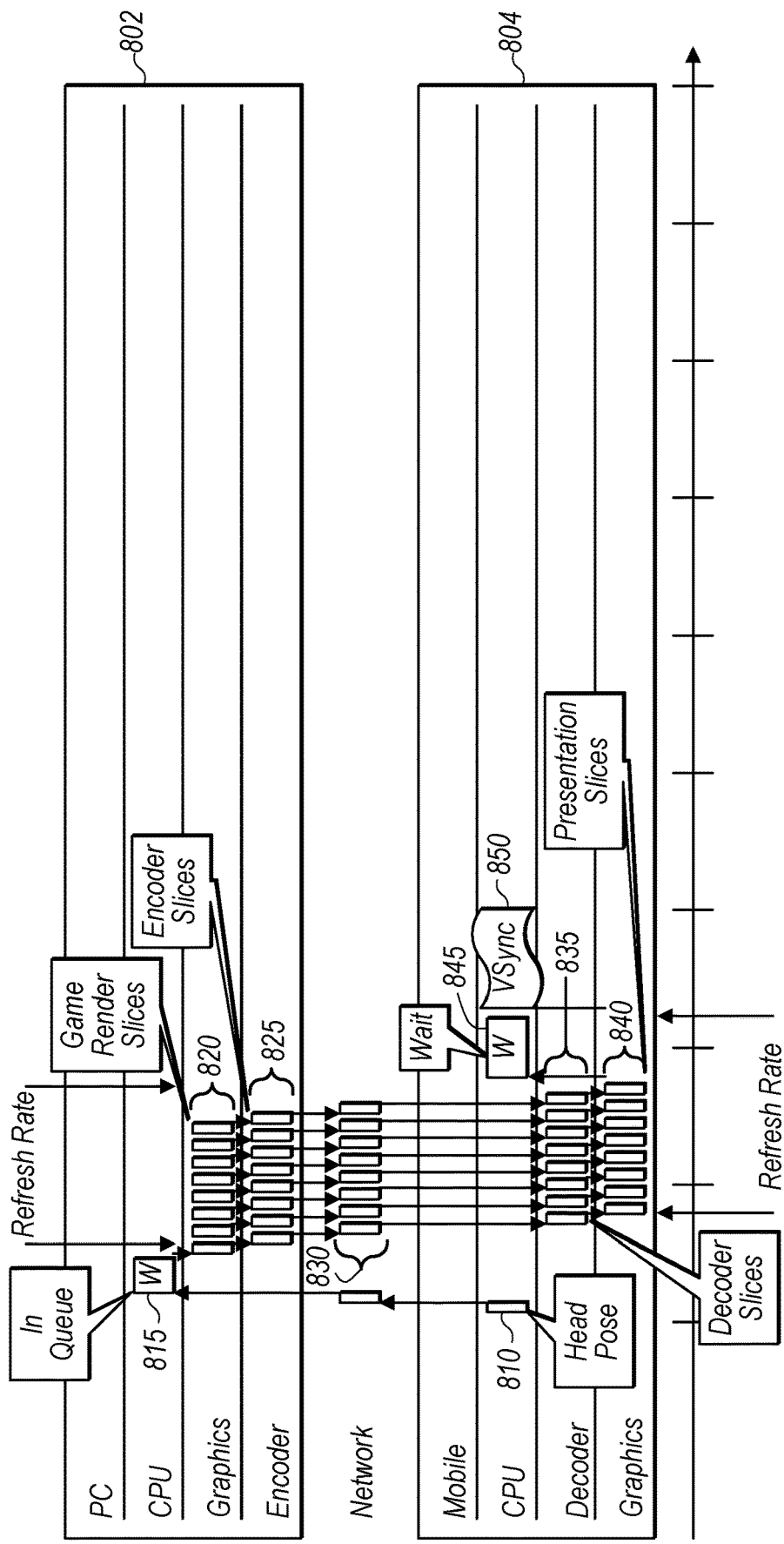
FIG. 8 is a timing diagram of another enhancement to a wireless VR/AR system for reducing latency.

Turning now to FIG. 8, a timing diagram of another enhancement to a wireless VR/AR system for reducing latency is shown. After the head pose 810 is captured and sent to computing device 802, the head pose 810 is enqueued by computing device 802 during a wait phase 815 while waiting for the start of the next frame according to the refresh rate. Next, the rendering step 820 and encoding step 825 are performed in parallel for individual slices of the frame which are then sent over the network in step 830. Then, mobile device 804 decodes the slices in step 835 which is performed in parallel with steps 820, 825, and 830. Also, the graphics engine on mobile device 804 starts preparing each slice for presentation in step 840 once each slice has been decoded. This allows presentation step 840 to be performed in parallel with steps 820, 825, 830, and 835. In one implementation, presentation step 840 involves performing a CSC and a time warp on the individual slices. After the slices have been prepared for presentation in step 840, mobile device 804 waits 845 until the next VSync 850 and then the frame is displayed to the user.

Figure 9:
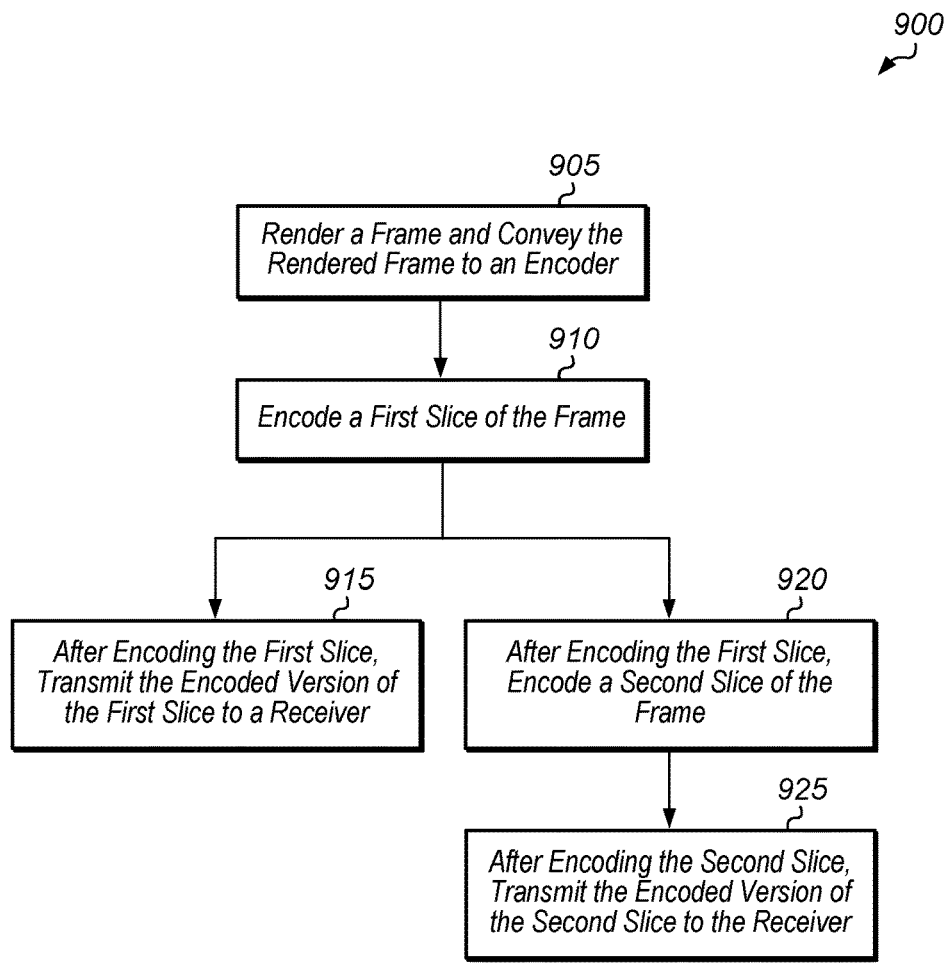
FIG. 9 is a generalized flow diagram illustrating one implementation of a method for reducing the latency of a wireless VR/AR system.
Figure 10:
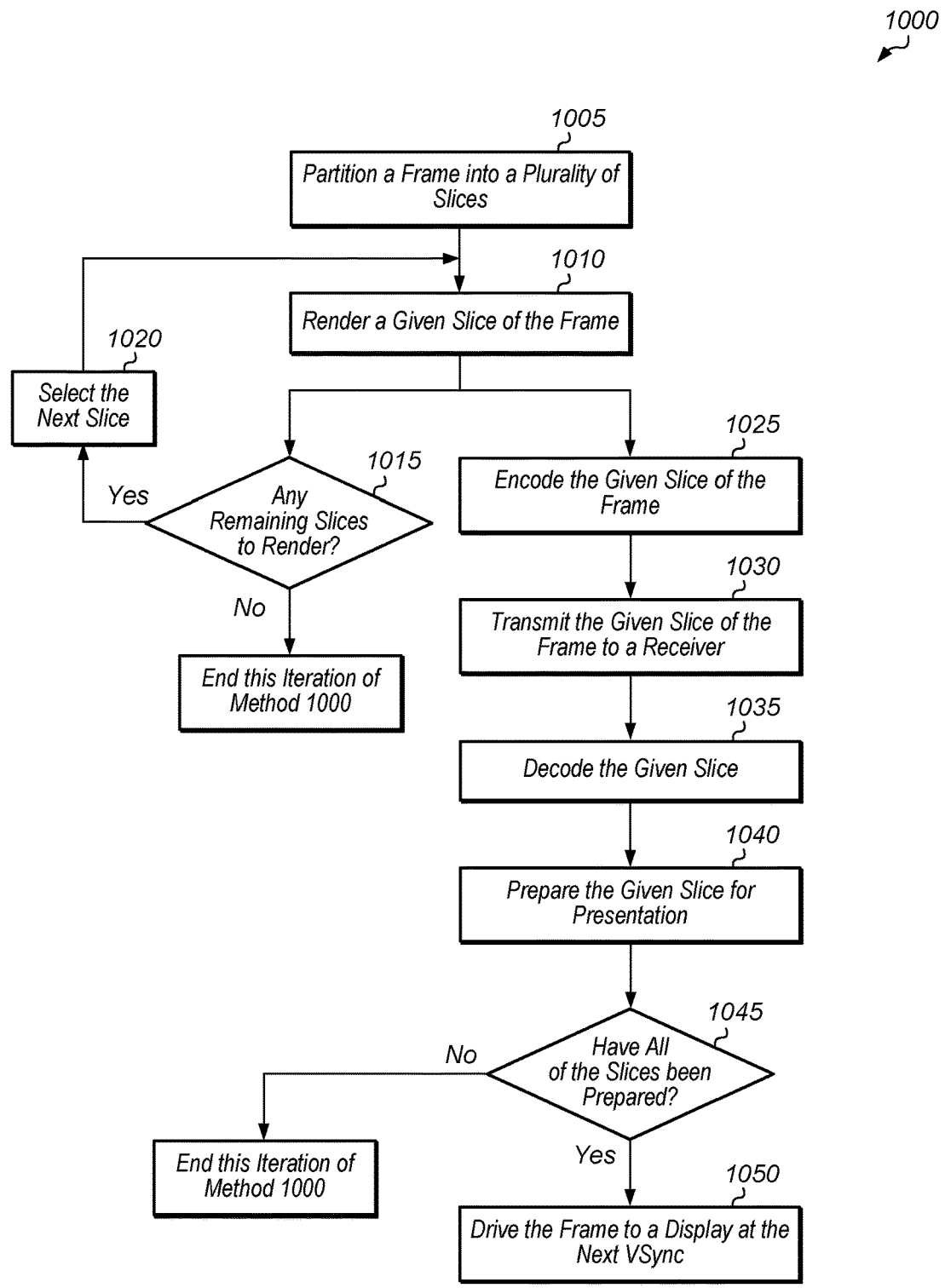
FIG. 10 is a generalized flow diagram illustrating one implementation of a method for reducing the latency of a wireless VR/AR system.
Figure 11:
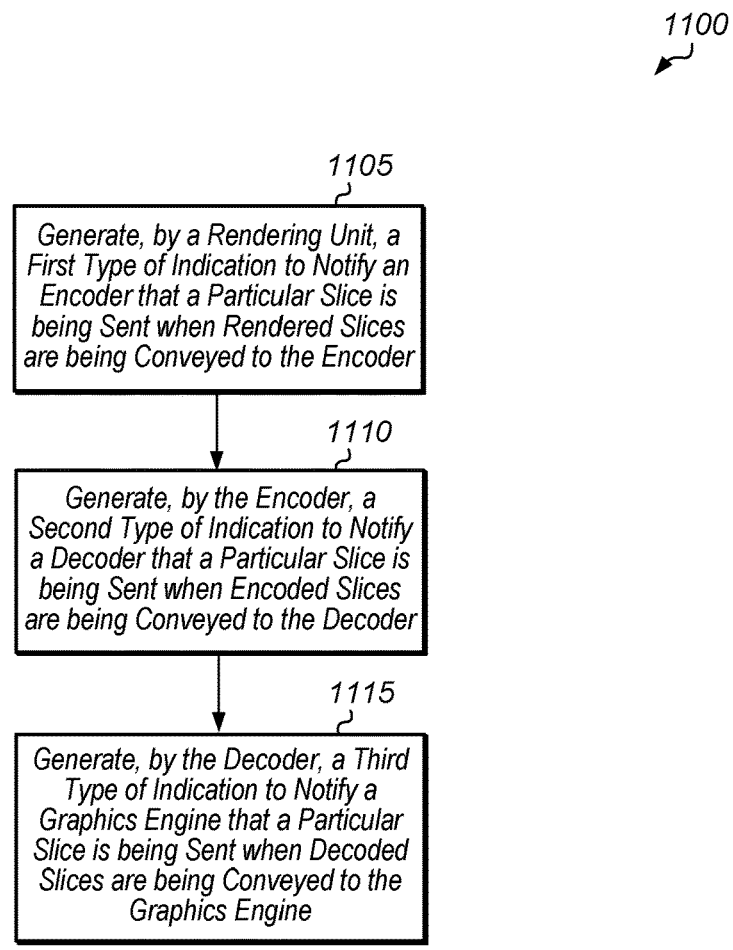
FIG. 11 is a generalized flow diagram illustrating one implementation of a method for signaling the end of a slice between units.
Figure 12:
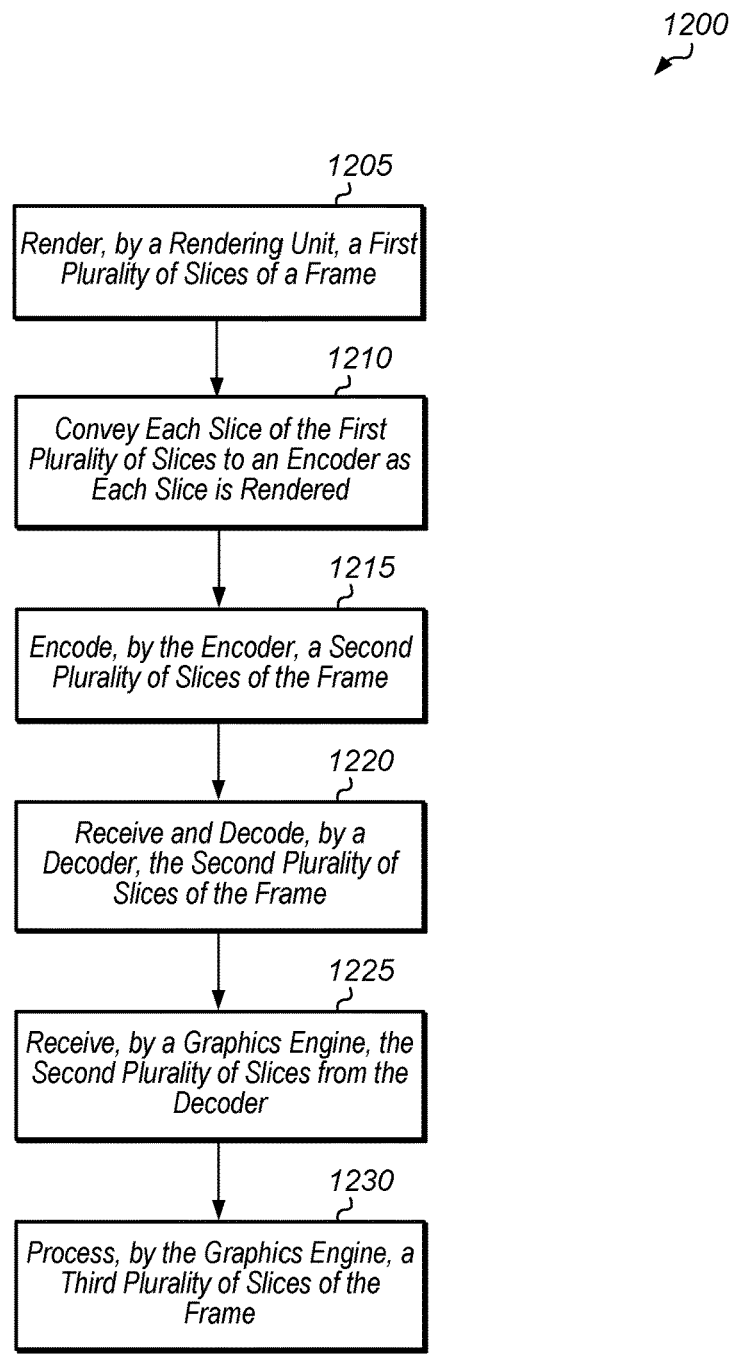
FIG. 12 is a generalized flow diagram illustrating one implementation of a method for adjusting the slice granularity by the units of a wireless VR/AR system.

Referring now to FIG. 9, one implementation of a method 900 for reducing the latency of a wireless VR/AR system is shown. For purposes of discussion, the steps in this implementation and those of FIG. 10-12 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900.

A rendering unit renders a frame and conveys the rendered frame to an encoder (block 905). The encoder encodes a first slice of the frame (block 910). In one implementation, the first slice of the frame is a left-eye portion of the frame. After encoding the first slice, the encoder transmits the encoded version of the first slice to a receiver (block 915). In parallel with transmitting the encoded version of the first slice to the receiver, the encoder encodes a second slice of the frame (block 920). In one implementation, the second slice of the frame is a right-eye portion of the frame. Next, the encoder transmits the encoded version of the second slice of the frame to the receiver after completing encoding of the second slice (block 925). After block 925, method 900 ends.

Turning now to FIG. 10, one implementation of a method 1000 for reducing the latency of a wireless VR/AR system is shown. A frame is partitioned into a plurality of slices (block 1005). Next, a rendering unit renders a given slice of the frame (block 1010). On the first iteration through method 1000, the rendering unit will render the first slice of the frame in block 1010. On the second iteration, the rendering unit will render the second slice, on the third iteration the rendering unit will render the third slice, and so on until all slices of the frame have been rendered.

After block 1010, two separate steps are initiated in parallel for two separate iterations of method 1000. For a first step, if there are any remaining slices of the frame that still need to be rendered (conditional block 1015, "yes" leg), then the rendering unit selects the next slice (block 1020), and then method 1000 returns to block 1010. For a second step, performed in parallel with conditional block 1015, the encoder encodes the given slice of the frame (block 1025). If all of the slices of the frame have now been rendered (conditional block 1015, "no" leg), then this iteration of method 1000 ends.

After encoding of the given slice is completed, a transmitter transmits the encoded version of the given slice to a receiver (block 1030). After the given slice has been received by the receiver, a decoder decodes the given slice (block 1035). After the given slice has been decoded, a graphics engine prepares the given slice for presentation (block 1040). If all slices of the frame have been prepared for preparation (conditional block 1045, "yes" leg), then the frame is driven to a display at the next VSync (block 1050). After block 1050, method 1000 ends. Otherwise, if there are still one or more slices that have not yet been prepared for preparation (conditional block 1045, "no" leg), then this iteration of method 1000 ends. It is noted that at any given time, any number of iterations of method 1000 can be traversing steps 1010, 1025, 1030, 1035, and 1040 for different slices of the frame. It is also noted that method 1000 can be repeated for each frame.

Referring now to FIG. 11, one implementation of a method 1100 for signaling the end of a slice between units is shown. A rendering unit generates a first type of indication to notify an encoder that a particular slice is being sent when rendered slices are being conveyed to the encoder (block 1105). In one implementation, the first type of indication is a slice ID which allows the encoder to assemble the slices back into a full frame. The slice ID can be communicated in many different ways and can be located anywhere within the data packet representing a slice. In another implementation, the first type of indication is an end-of-slice indication sent at the end of the particular slice. Depending on the implementation, the end-of-slice indication is a specific encoding, bit-pattern, signal via a sideband channel interface, or other indication. In other implementations, other types of slice indications can be generated. Next, the encoder generates a second type of indication to notify a decoder that a particular slice is being sent when encoded slices are being conveyed to the decoder (block 1110). In one implementation, the second type of indication is different from the first type of indication. Then, the decoder generates a third type of indication to notify a graphics engine that a particular slice is being sent when decoded slices are being conveyed to the graphics engine (block 1115). In one implementation, the third type of indication is different from the second type of indication. After block 1115, method 1100 ends.

By using different types of indications throughout the wireless VR/AR system, the different units are made aware that they can start consuming a slice while simultaneously receiving data from a subsequent slice. Each unit in the system can follow different protocols and have different types of processing units responsible for receiving and processing the individual slices. Method 1100 allows the process to be customized to each unit within the system to increase efficiency during the processing of frames of a video sequence.

Turning now to FIG. 12, one implementation of a method 1200 for adjusting the slice granularity by the units of a wireless VR/AR system is shown. A rendering unit renders a first plurality of slices of a frame (block 1205). The rendering unit conveys each slice of the first plurality of slices to an encoder as each slice is rendered (block 1210). The encoder encodes a second plurality of slices of the frame (block 1215). In one implementation, the number of slices in the second plurality of slices is different from the number of slices in the first plurality of slices. For example, in one scenario, the encoder encodes a single slice for each two slices received from the rendering unit. In this scenario, the rendering unit renders twice the number of slices per frame as the number of slices encoded by the encoder per frame. For example, the rendering unit could render 256 slices per frame while the encoder encodes 128 slices per frame. In another scenario, the encoder encodes two slices for each slice received from the rendering unit. For example, in this scenario, the rendering unit could render 1024 slices per frame while the encoder encodes 2048 slices per frame. In other scenarios, the encoder combines multiple slices or splits each slice received from the rendering unit in other ratios to generate each encoded slice.

Next, a decoder receives and decodes the second plurality of slices of the frame (block 1220). Then, a graphics engine receives the second plurality of slices from the decoder (block 1225). Next, the graphics engine processes a third plurality of slices of the frame (block 1230). In one implementation, the number of slices in the third plurality of slices is different from the number of slices in the second plurality of slices. After block 1230, method 1200 ends. By using method 1200, each unit of the wireless VR/AR system is able to process and generate slices at a granularity which is well suited to the functionality of the unit. While a first size of slice might be preferable for the rendering unit, the encoder might prefer encoding a second size of slice which is different from the first size of slice. Other units can also process slices in sizes different from the sizes of slices processed by the encoder and rendering unit.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a rendering unit comprising circuitry configured to render slices of a frame; and
    an encoder comprising circuitry configured to encode a first slice of a frame to generate an encoded version of the first slice, wherein the encoded version of the first slice is generated in parallel with the rendering unit rendering a second slice of the frame;
    wherein the rendering unit is configured to generate a first type of indication to notify the encoder that a particular slice is being conveyed to the encoder.

2. The system as recited in claim 1, wherein each of the first slice of the frame and the second slice of the frame correspond to a different eye portion of the frame.

3. The system as recited in claim 2, wherein each different eye portion of the frame corresponds to one of a right-eye portion of the frame and a left-eye potion of the frame.

4. The system as recited in claim 2, further comprising a transmitter comprising circuitry configured to transmit the first slice of the frame in parallel with the encoder encoding the second slice of the frame.

5. The system as recited in claim 1, wherein the first type of indication is at least one of an end of slice indication or a slice identifier.

6. The system as recited in claim 1, wherein the encoder is further configured to generate a second type of indication to notify a decoder that a particular slice is being conveyed by the encoder.

7. The system as recited in claim 1, wherein the system is configured to transmit a plurality of encoded slices of a given frame corresponding to a first eye portion of the given frame prior to transmitting encoded slices of a second eye portion of the given frame, wherein the first eye portion corresponds to a different eye of a left eye and a right eye than the second eye portion.

8. A method comprising:
rendering, by a rendering unit comprising circuitry, slices of a frame;
encoding, by an encoder comprising circuitry, a first slice of a frame to generate an encoded version of the first slice, wherein the encoded version of the first slice is generated in parallel with the rendering unit rendering a second slice of the frame; and
generating, by the rendering unit, a first type of indication to notify the encoder that a particular slice is being conveyed to the encoder.

9. The method as recited in claim 8, wherein each of the first slice of the frame and the second slice of the frame correspond to a different eye portion of the frame.

10. The method as recited in claim 9, wherein each different eye portion of the frame corresponds to one of a right-eye portion of the frame and a left-eye potion of the frame.

11. The method as recited in claim 9, further comprising a transmitter comprising circuitry configured to transmit the first slice of the frame in parallel with the encoder encoding the second slice of the frame.

12. The method as recited in claim 8, wherein the first type of indication is at least one of an end of slice indication or a slice identifier.

13. The method as recited in claim 12, wherein the encoder is further configured to generate a second type of indication to notify a decoder that a particular slice is being conveyed by the encoder.

14. The method as recited in claim 8, further comprising transmitting a plurality of encoded slices of a given frame corresponding to a first eye portion of the given frame prior to transmitting encoded slices of a second eye portion of the given frame, wherein the first eye portion corresponds to a different eye of a left eye and a right eye than the second eye portion.

15. A system comprising:
an interface comprising circuitry configured to receive a first slice of a frame and a second slice of a frame, wherein each of the first slice and the second slice correspond to a different one of a right-eye portion and a left-eye portion of the frame; and
a decoder comprising circuitry configured to decode the first slice of the frame prior to receipt of the second slice of the frame.

16. The system as recited in claim 15, wherein the interface is a wireless communication interface.

17. The system as recited in claim 15, wherein the decoder is included in a head mounted display.

18. The system as recited in claim 15, wherein the interface is configured to receive an indication corresponding to the first slice of the frame, and the decoder is configured to decode the first slice in response to detecting the indication.

* * * * *